United States Patent Office 3,310,535
Patented Mar. 21, 1967

3,310,535
ACRYLONITRILE TETRAPOLYMERS, PROCESS FOR PREPARING SAME AND FIBERS THEREOF
Corrado Mazzolini and Sergio Lo Monaco, Mestre, Italy, assignors to Monsanto Company, St. Louis, Mo., a corporation of Delaware
No Drawing. Filed June 24, 1963, Ser. No. 300,402
8 Claims. (Cl. 260—78.5)

The present invention relates to a polymeric composition having a base of a copolymer of acrylonitrile with vinylidene chloride, modified with small quantities of other comonomers which impart improved textile properties to the composition.

More particularly, the invention relates to the obtaining of non-inflammable acrylic fibers having good dyeing properties.

It is known that the copolymers of acrylonitrile with vinylidene chloride form very valuable synthetic fibers. It is furthermore known to obtain fibers from polymers or copolymers of acrylonitrile which contain a small percentage of other vinyl monomers. The vinyl monomers most generally used in the polymeric acrylonitrile compositions are for example vinyl acetate, methyl or ethyl acrylate and methacrylate, styrene, etc., and have the function of increasing the receptivity of the resultant fibers for dyes. It is believed that the acrylic polymers obtained by free radical polymerization by means of redox catalysts, for example potassium persulfate and sulfur dioxide, have acid groups in the macromolecules, which are probably sulfonic or sulfate groups derived from the catalytic system and which determine the affinity of the composition for basic dyestuffs.

These groups are evident even in a homopolymer of acrylonitrile, but the fibers obtained from pure polyacrylonitrile in actual practice have poor receptivity for dyes, or require complicated methods of dyeing, due to the difficulties which the dyestuffs have in penetrating into the compact structure which the fibers assume with the orienting of the molecules. The comonomers indicated above modify the polymers of acrylonitrile so as to introduce along the polymer chain groups of steric dimensions substantially greater than those of the —C≡N group. These groups disturb the lateral order of the macromolecules in the fiber, reducing the compactness thereof, and thus making the groups having affinity for dyestuffs easily accessible to the latter under normal dyeing conditions.

The fibers obtained from the copolymers indicated above can be dyed not only with basic dyestuffs, but also with dispersed or dispersed acetate dyestuffs, which fix themselves within the fiber, not so much by chemical affinity as due to their ability to place themselves in the intermolecular spaces available between the polymer chains. The vinyl comonomers in question, however, substantially change the physical properties of the resultant fibers, and in particular worsen their sensitivity to heat, such as the softening point and the shrinkability at temperatures above 80° C. Furthermore, they do not improve any other property of the fiber, aside from the receptivity for dyes. Their content in acrylic polymers is therefore limited to a minimum indispensable to develop the dyeing properties, and is maintained below 15% and, preferably, between 4 and 8 percent by weight.

However, an entirely different behavior is presented by the copolymers of acrylonitrile with vinylidene chloride. While the other vinyl monomers start to substantially change the properties of polyacrylonitrile even at a content of only 5 percent by weight, vinylidene chloride gives rise to copolymers of better characteristics, at least equivalent to polyacrylonitrile, for contents up to more than 30 percent by weight. (See in this connection the article by I. Okamura, M. Uchida and J. Nagao in Kagyo Kagaku Zusshi, 1957, vol. 60, page 773, abstracted in Chemical Abstracts, 1959, vol. 53, page 8693.) In particular, the copolymers of acrylonitrile with vinylidene chloride have two important advantages for the production of synthetic fibers, namely:

(1) The halogen content imparts to the fiber properties of resistance to inflammability which are very valuable, particularly in certain applications such as carpets, curtains, covers, etc., and particularly for use in places such as theatres, ships, airplanes and other public places where the danger of fire is particularly serious.

(2) The glass transition temperature of the copolymers of acrylonitrile with vinylidene chloride is substantially raised, changing from a value of 87° C. in the case of pure polyacrylonitrile or its copolymers with small amounts of vinyl acetate and other acrylic monomers to values of 110° to 135° C. for vinylidene chloride contents of between 7 and 30 percent by weight. This means that the fibers retain good resistance to deforming stresses, even at temperatures equal to or above that of boiling water, imparting to the finished products substantial resistance to stress treatment, even under the combined action of moisture and heat.

Together with all of these advantages, however, vinylidene chloride has the defect of not improving the receptivity for dyes of copolymers with acrylonitrile, and even making them less dyeable than polyacrylonitrile itself, so that the receptivity for dyes of the resultant fibers is practically nil, and their use greatly limited.

It has now been found that copolymers of acrylonitrile and vinylidene chloride containing the latter in sufficient proportions to impart the desired properties of non-flammability to the fibers acquire the properties of receptivity for dyes desired in practical use if in addition to the vinylidene chloride in an amount of from about 5 to 25 percent, such copolymers contain copolymerized therewith at least two other comonomers of particular function. More particularly, if such copolymers also contain at least 1 percent and preferably 3 to 8 percent of one or more other vinyl monomers having side groups of high steric hindrance dimensions, such as vinyl acetate, methyl acrylate, methyl methacrylate, ethyl acrylate, ethyl methacrylate, styrene, α-methylstyrene, acrylamide, N-methyl and N-ethyl acrylamide, etc., and an even smaller amount of from 0.1 to 3 percent, and preferably 0.5 to 2 percent, of a monomer which has an acid function available for the fixing of basic dyes, such as for example, itaconic acid, cinnamic acid, maleic acid or anhydride, carboxy vinyl phthalic acid, vinyl benzene sulfonic acid, allyl sulfonic acid or the corresponding salts of such acids, etc.

Furthermore, this finding is surprising in view of the fact that the comonomers having hindrance side groups and the comonomers of acid function, if used individually, are not effective, as is clearly shown by the following examples.

As a matter of fact, it will be apparent from an examination of the values for the various types of fibers that only the fibers obtained from the copolymers which are the subject matter of the present invention exhibit, together with the property of withstanding the propagation of flame, good receptivity for basic and dispersed dyes. These fibers also have a substantially pure and pleasing white color and have excellent physical properties, as set forth in Table II, in which:

Den. is denier
Ten. is tenacity
El. is elongation
DWL is dominant wave length
IP is purity index
B is brightness The latter three values express the color in accordance with the C.I.E. system, cf. Journal of the Optical Society of America, vol. 28, page 52 (1938), and publications of the National Bureau of Standards in "Paper Trade Journal," vol. 103–108, page 38 (1036).

*Example No. 1*

In a glass reactor, provided with agitator and an overflow tube for the discharge of the reaction mixture which reactor is maintained under a stream of nitrogen, there are continuously fed 90 parts of acrylonitrile, 10 parts by weight of vinylidene chloride and 600 parts of water in two separate streams containing the quantities of potassium persulfate catalyst and sulfur dioxide activator necessary to induce the polymerization, together with the amount of sodium bicarbonate necessary to maintain the pH at a value of about 3. The dwell time of the reagents in the reactor is about 75 minutes. From the overflow tube, there is discharged a reaction mixture which contains 72 parts by weight of polymer having a composition of 87.9 percent acrylonitrile and 12.1 percent vinylidene chloride. The receptivity of this copolymer for dyes is very poor, practically nil.

*Example No. 2*

An acrylonitrile/vinylidene chloride copolymer is prepared in the manner indicated in the previous example, merely changing the time of reaction, which in this case is 40 minutes. The copolymer obtained has a composition of 86.3 percent acrylonitrile and 13.7 percent vinylidene chloride. The receptivity for dyes is very poor.

*Example No. 3*

An acrylonitrile/vinylidene chloride/vinyl acetate terpolymer is prepared by polymerizing 84 parts of acrylonitrile, 10 parts of vinylidene chloride and 6 parts of vinyl acetate under the same conditions as those described in Example 1. The results of the determinations carried out on this terpolymer are set forth in Table I. The receptivity for dyes of this copolymer is rather poor.

*Example No. 4*

An acrylonitrile/vinylidene chloride/vinyl acetate terpolymer is prepared by polymerizing under the conditions described in Example 1 80 parts of acrylonitrile, 10 parts of vinylidene chloride and 10 parts of vinyl acetate, with a reaction time of 40 minutes. The results of the determinations carried out on the polymer obtained are set forth in Table I. The receptivity for dyes of the copolymer is rather poor.

*Example No. 5*

An acrylonitrile/vinylidene chloride/cinnamic acid terpolymer is prepared by polymerizing 89 parts of acrylonitrile, 10 parts of vinylidene chloride and 1 part of cinnamic acid under conditions similar to those described in Example 1, with a time of reaction of 40 minutes. The results are set forth in Table I. The polymer has a fair receptivity for dyes which, however, is not retained by the fiber.

*Example No. 6*

An acrylonitrile/vinylidene chloride/vinyl acetate/itaconic acid tetrapolymer is prepared by polymerizing 84 parts of acrylonitrile, 10 parts of vinylidene chloride, 5 parts of vinyl acetate and 1 part of itaconic acid under conditions similar to those described in Example 1 for a reaction time of 40 minutes. The results of the determinations are set forth in Table I. The receptivity of the polymer for dyes is good.

*Example No. 7*

An acrylonitrile/vinylidene chloride/vinyl acetate/cinnamic acid tetrapolymer is prepared by polymerizing 84.5 parts of acrylonitrile, 10 parts of vinylidene chloride, 5 parts of vinyl acetate, and 0.5 part of cinnamic acid, under conditions similar to those described in Example 1 for a reaction time of 40 minutes. The results of the determinations are set forth in Table I. The receptivity for dyes is good.

*Example No. 8*

An acrylonitrile/vinylidene chloride/vinyl acetate/cinnamic acid tetrapolymer is prepared by polymerizing 85.5 parts of acrylonitrile, 10 parts of vinylidene chloride, 4 parts of vinyl acetate, and 0.5 part of cinnamic acid under conditions similar to those described in Example 1. The results of the determinations are set forth in Table I. The receptivity for dyes is good.

*Example No. 9*

An acrylonitrile/vinylidene chloride/vinyl acetate, cinnamic acid tetrapolymer is prepared by polymerizing 86.5 parts of acrylonitrile, 10 parts of vinylidene chloride, 3 parts of vinyl acetate and 0.5 part of cinnamic acid under conditions similar to those described in Example 1. The results of the determinations are set forth in Table I. The receptivity for dyes is good.

*Example No. 10*

An acrylonitrile/vinylidene chloride/vinyl acetate/cinnamic acid tetrapolymer is prepared by polymerizing 88 parts of acrylonitrile, 7.5 parts of vinylidene chloride, 4 parts of vinyl acetate, and 0.5 part of cinnamic acid under conditions similar to those of Example 1. The results of the determinations are set forth in Table I. The receptivity for dyes is good.

*Example No. 11*

An acrylonitrile/vinylidene chloride/vinyl acetate/cinnamic acid tetrapolymer is prepared by polymerizing 88 parts of acrylonitrile, 7.5 parts of vinylidene chloride, 4 parts of vinyl acetate and 0.5 part of cinnamic acid under conditions similar to those of Example 1. The results of the determinations are set forth in Table I. The receptivity for dyes is good.

*Example No. 12*

An acrylonitrile/vinylidene chloride/vinyl acetate/carboxy vinyl phthalic acid tetrapolymer is prepared by polymerizing 84.5 parts of acrylonitrile, 10 parts of vinylidene chloride, 5 parts of vinyl acetate, and 0.5 part of carboxy vinyl phthalic acid under conditions similar to those of Example 1. The results of the determinations are set forth in Table I. The receptivity for dyes is good.

*Example No. 13*

An acrylonitrile/vinylidene chloride/vinyl acetate/ sodium vinyl benzene sulfonate tetrapolymer is prepared by polymerizing 84.2 parts of acrylonitrile, 10 parts of vinylidene chloride, 5 parts of vinyl acetate, and 0.8 part of sodium vinyl benzene sulfonate, under conditions similar to those of Example 1. The results of the determinations are set forth in Table I. The receptivity for dyes is good.

*Example No. 14*

An acrylonitrile/vinylidene chloride/vinyl acetate/ sodium methallyl sulfonate tetrapolymer is prepared by polymerizing 84.5 parts of acrylonitrile, 10 parts of vinylidene chloride, 5 parts of vinyl acetate, and 0.5 part of sodium methallyl sulfonate under conditions similar to those of Example 1. The results of the determinations are set forth in Table I. The receptivity for dyes is good.

Example No. 15

An acrylonitrile/vinylidene chloride, methyl acrylate, cinnamic acid tetrapolymer is prepared by polymerizing 83.5 parts of acrylonitrile, 10 parts of vinylidene chloride, 6 parts of methyl acrylate and 0.5 part of cinnamic acid under conditions similar to those of Example 1. The results of the determinations are set forth in Table I. The receptivity to dyes is good.

Example No. 16

An acrylonitrile/vinylidene chloride/methyl methacrylate/cinnamic acid tetrapolymer is prepared by polymerizing 84.5 parts of acrylonitrile, 10 parts of vinylidene chloride, 5 parts of methyl methacrylate and 0.5 part of cinnamic acid under conditions similar to those of Example 1. The results of the determinations are set forth in Table I. The receptivity for dyes is good.

Example No. 17

An acrylonitrile/vinylidene chloride/styrene/cinnamic acid tetrapolymer is prepared by polymerizing 86.5 parts of acrylonitrile, 10 parts of vinylidene chloride, 3 parts of styrene and 0.5 part of cinnamic acid under conditions similar to those described in Example 1. The results of the determinations are set forth in Table I. The receptivity for dyes is good.

Example No. 18

An acrylonitrile/vinylidene chloride/N-ethylacrylamide/cinnamic acid tetrapolymer is prepared by polymerizing 82.5 parts of acrylonitrile, 10 parts of vinylidenechloide, 7 parts of N-ethylacrylamide and 0.5 part of cinnamic acid under conditions similar to those of Example 1. The results of the determinations are set forth in Table I. The receptivity for dyes is good.

Examples 19 to 32

The copolymers obtained in accordance with the previous examples are dissolved in dimethyl acetamide with the addition of a small amount of suitable color and heat stabilizers in amounts of 0.25 percent of each. The fibers obtained from the solutions in accordance with the ordinary methods of spinning have the characteristics set forth in Table II compared with those of a fiber obtained from acrylonitrile/vinyl acetate copolymer containing 95 percent acrylonitrile and 6 percent vinyl acetate. The evaluation of the inflammability was effected on carpets obtained from the fibers of the individual examples using:

Yarn denier _____ 5760
Twist, turns per inch _____ 36
Needles per decimeter _____ 21
Stitches per decimeter _____ 33

The dye receptivity was determined by applying a standard basic dye-stuff, Sevron Blue 2G (Color Index Basic Blue 22), to the fibers in a standard dye bath and determining the amount of dyestuff fixed to the fibers.

TABLE I

| Ex. No. | Acrylonitrile, Percent | $VCl_2$, Percent | Comonomer Having Hindrance Side Group, Percent | Acid Comonomer | Conversion | Percent $VCl_2$ in Polymer | Comonomer Having Hindrance Group Percent in Polymer | Specific Viscosity |
|---|---|---|---|---|---|---|---|---|
| 1 | 90 | 10 | | | 72.4 | 12.1 | | 0.208 |
| 2 | 90 | 10 | | | 66.6 | 13.7 | | 0.234 |
| 3 | 84 | 10 | Vinyl Acetate, 6 | | 69.3 | 10.6 | 4.8 | 0.168 |
| 4 | 80 | 10 | Vinyl Acetate, 10 | | 68.2 | 13.1 | 7.33 | 0.146 |
| 5 | 89 | 10 | Vinyl Acetate | Cinnamic Acid, 1 | 66.8 | 12.0 | | 0.191 |
| 6 | 84 | 10 | Vinyl Acetate, 5 | Itaconic Acid, 1 | 67.0 | 13.4 | 4.00 | 0.215 |
| 7 | 84.5 | 10 | ___do___ | Cinnamic Acid, 0.5 | 64.8 | 13.6 | 3.78 | 0.189 |
| 8 | 85.5 | 10 | Vinyl Acetate, 4 | ___do___ | 68.9 | 13.2 | 3.11 | 0.154 |
| 9 | 86.5 | 10 | Vinyl Acetate, 3 | ___do___ | 66.0 | 13.8 | 2.38 | 0.144 |
| 10 | 88 | 7.5 | Vinyl Acetate, 4 | ___do___ | 70.2 | 9.5 | 3.25 | 0.128 |
| 11 | 88 | 7.5 | ___do___ | ___do___ | 67.0 | 9.3 | 3.10 | 0.144 |
| 12 | 84.5 | 10 | Vinyl Acetate, 5 | Carboxy vinyl Phthalic Acid, 0.5 | 68.2 | 12.8 | 3.8 | 0.190 |
| 13 | 84.2 | 10 | ___do___ | Sodium vinyl Benzene Sulfonate, 0.8 | 67.5 | 13.1 | 3.6 | 0.170 |
| 14 | 84.5 | 10 | ___do___ | Sodium Methallyl sulfonate, 0.5 | 66.8 | 13.1 | 3.9 | 0.182 |
| 15 | 83.5 | 10 | Methyl Acrylate, 6 | Cinnamic Acid, 0.5 | 65 | 13.6 | 4.1 | 0.189 |
| 16 | 84.5 | 10 | Methacrylate, 5 | ___do___ | 64.7 | 13.6 | 3.8 | 0.185 |
| 17 | 86.5 | 10 | Styrene, 3 | ___do___ | 65.2 | 13.4 | 4.8 | 0.188 |
| 18 | 82.5 | 10 | N-ethyl acrilamide, 7 | ___do___ | 65 | 13.5 | 5 | 0.186 |

TABLE II

| Ex. No. | Polymer Use | Stabilizer Estabex S [1] | $P_2O_5$ | Den. | Ten. | El., Percent | DWL | IP | B | Dye Receptivity | Resistance To Flame |
|---|---|---|---|---|---|---|---|---|---|---|---|
| | Control Copolymer of 94% AN and 6% VA. | | | 2.8 | 2.78 | 29.5 | 574.5 | 94.6 | 84.5 | Normal dye receptivity. | Propagates combustion. |
| 19 | Copol. Es. 1 | 0.25 | 0.25 | 3.4 | 2.8 | 26 | 574.2 | 94.5 | 77.3 | Very inferior | Does not propagate combustion. |
| 20 | Copol. Es. 3 | | | 3.28 | 2.55 | 23.2 | 575.9 | 89.5 | 65.2 | ___do___ | Do. |
| 21 | Copol. Es. 6 | | | 3.26 | 2.67 | 27.3 | 576.1 | 90.8 | 73.4 | Superior | Do. |
| 22 | Copol. Es. 7 | 0.25 | 0.25 | 2.94 | 2.87 | 30.9 | 574.2 | 95.2 | 86.2 | Slightly inf | Do. |
| 23 | Copol. Es. 8 | 0.25 | 0.25 | 2.92 | 2.79 | 26.8 | 573.7 | 95.8 | 86.9 | ___do___ | Do. |
| 24 | Copol. Es. 9 | 0.25 | 0.25 | 2.91 | 2.78 | 21.9 | 573.8 | 95.5 | 84.8 | Same as Control | Do. |
| 25 | Copol. Es. 11 | 0.25 | 0.25 | 2.91 | 3.05 | 22.1 | 573.3 | 96.3 | 86.4 | ___do___ | Do. |
| 26 | Copol. Es. 12 | 0.25 | 0.25 | 2.95 | 2.70 | 27.1 | 574.1 | 95 | 84.2 | ___do___ | Do. |
| 27 | Copol. Es. 13 | 0.25 | 0.25 | 2.8 | 2.63 | 29.1 | 574 | 96.1 | 86.1 | ___do___ | Do. |
| 28 | Copol. Es. 14 | 0.25 | 0.25 | 3.1 | 2.75 | 26.8 | 574.3 | 95.6 | 85 | ___do___ | Do. |
| 29 | Copol. Es. 15 | 0.25 | 0.25 | 2.94 | 2.87 | 30.5 | 574.2 | 95.2 | 86 | ___do___ | Do. |
| 30 | Copol. Es. 16 | 0.25 | 0.25 | 2.93 | 2.85 | 30.9 | 574.2 | 95.3 | 86.2 | ___do___ | Do. |
| 31 | Copol. Es. 17 | 0.25 | 0.25 | 2.94 | 2.87 | 32.3 | 574.1 | 95.2 | 86.4 | Slightly inf | Do. |
| 32 | Copol. Es. 18 | 0.25 | 0.25 | 2.94 | 2.84 | 30.3 | 574 | 95.2 | 86.2 | Same as Control | Do. |

[1] Product of Hourg and Van Der Lande.

We claim:
1. New linear tetrapolymer compositions having high flame resistance and improved receptivity for basic and dispersed dyes comprising:
   (a) from 62 to 94 percent acrylonitrile
   (b) from 5 to 25 percent vinylidene chloride
   (c) from 1 to 10 percent of at least one other vinyl monomer having a side group of greater stearic hindrance than the cyanide group, and
   (d) from 0.1 to 3 percent of at least one different alkenyl monomer having at least one free acid function.
2. The new linear tetrapolymer compositions of claim 1 wherein:
   (a) the vinyl monomer having a side group of greater steric hindrance than the cyanide group (c) is selected from the group consisting of vinyl carboxylates, methyl acrylate, methyl methacrylate, ethyl acrylate, ethyl methacrylate, styrene, $\alpha$-methylstyrene, acrylamide, N-methyl acrylamide and N-ethylacrylamide, and
   (b) the alkenyl monomer having at least one free acid function (d) is selected from the group consisting of itaconic acid, cinnamic acid, maleic acid, maleic anhydride, carboxy vinyl phthalic, vinyl benzene sulfonic acid, allyl sulfonic acid, methallyl sulfonic acid and the alkali metal salts thereof.
3. New linear tetrapolymer compositions having high flame resistance and improved receptivity for basic and dispersed dyes comprising:
   (a) from 65 to 91.5 percent acrylonitrile
   (b) from 5 to 25 percent vinylidene chloride
   (c) from 3 to 8 percent of at least one other vinyl monomer having a side group of greater steric hindrance than the cyanide group, and
   (d) from 0.5 to 2 percent of at least one different alkenyl monomer having at least one free acid function.
4. The new acrylonitrile tetrapolymer compositions of claim 3 wherein:
   (a) the vinyl monomer having a side group of greater steric hindrance than the cyanide group (c) is selected from the group consisting of vinyl carboxylates, methyl acrylate, methyl methacrylate, ethyl acrylate, ethyl methacrylate, styrene, $\alpha$-methylstyrene, acrylamide, N-methyl acrylamide and N-ethylacrylamide, and
   (b) the alkenyl monomer having at least one free acid function (d) is selected from the group consisting of itaconic acid, cinnamic acid, maleic acid, maleic anhydride, carboxy vinyl phthalic, vinyl benzene sulfonic acid, allyl sulfonic acid, methallyl sulfonic acid and the alkali metal salts thereof.
5. Flame resistant acrylonitrile polymer fibers having improved receptivity for basic and dispersed dyes of the compositions of claim 1.
6. Flame resistant acrylonitrile polymer fibers having improved receptivity for basic and dispersed dyes of the composition of claim 3.
7. The method of preparing linear tetrapolymer compositions having high flame resistance and improved receptivity for basic and dispersed dyes comprising copolymerizing in aqueous suspension and in the presence of a free-radical redox catalyst system:
   (a) from 62 to 94 percent acrylonitrile,
   (b) from 5 to 25 percent vinylidene chloride,
   (c) from 1 to 10 percent of at least one other vinyl monomer having a side group of greater steric hindrance than the cyanide group, and
   (d) from 0.1 to 3 percent of at least one different alkenyl monomer having at least one free acid function.
8. The method of claim 7 wherein:
   (a) the vinyl monomer having a side group of greater steric hindrance than the cyanide group (c) is selected from the group consisting of vinyl carboxylates, methyl acrylate, methyl methacrylate, ethyl acrylate, ethyl methacrylate, styrene, $\alpha$-methylstyrene, acrylamide, N-methyl acrylamide and N-ethylacrylamide, and
   (b) the alkenyl monomer having at least one free acid function (d) is selected from the group consisting of itaconic acid, cinnamic acid, maleic acid, maleic anhydride, carboxy vinyl phthalic, vinyl benzene sulfonic acid, allyl sulfonic acid, methallyl sulfonic acid and the alkali metal salts thereof.

References Cited by the Examiner

UNITED STATES PATENTS

| | | | |
|---|---|---|---|
| 2,531,408 | 11/1950 | D'Alelio | 260—80.5 |
| 3,020,265 | 2/1962 | Tietz | 260—79.3 |
| 3,123,588 | 3/1964 | Lunney | 260—80.5 |
| 3,202,641 | 8/1965 | Nakajima et al. | 260—80.5 |

JOSEPH L. SCHOFER, *Primary Examiner.*

W. HOOVER, *Assistant Examiner.*